United States Patent
Wu et al.

(10) Patent No.: US 11,687,623 B2
(45) Date of Patent: Jun. 27, 2023

(54) ANTI-PIRACY FRAMEWORK FOR DEEP NEURAL NETWORKS

(71) Applicant: UNIVERSITY OF MARYLAND, COLLEGE PARK, College Park, MD (US)

(72) Inventors: Min Wu, Clarksville, MD (US); Mingliang Chen, Greenbelt, MD (US)

(73) Assignee: UNIVERSITY OF MARYLAND, COLLEGE PARK, College Park, MD (US)

(*) Notice: Subject to any disclaimer, the term of this patent is extended or adjusted under 35 U.S.C. 154(b) by 548 days.

(21) Appl. No.: 16/709,422

(22) Filed: Dec. 10, 2019

(65) Prior Publication Data

US 2020/0184036 A1    Jun. 11, 2020

Related U.S. Application Data

(60) Provisional application No. 62/777,665, filed on Dec. 10, 2018.

(51) Int. Cl.
    G06F 21/10    (2013.01)
    G06N 3/04     (2006.01)
    G06F 21/60    (2013.01)
    G06F 21/62    (2013.01)
    G06F 21/00    (2013.01)

(52) U.S. Cl.
    CPC .............. *G06F 21/10* (2013.01); *G06F 21/60* (2013.01); *G06F 21/604* (2013.01); *G06F 21/62* (2013.01); *G06N 3/04* (2013.01)

(58) Field of Classification Search
    CPC .......... G06F 21/60; G06F 21/62; G06F 21/10; G06F 21/12; G06F 21/121; G06F 21/125; G06F 21/14; G06N 3/04
    See application file for complete search history.

(56) References Cited

U.S. PATENT DOCUMENTS

2019/0044918 A1*  2/2019  Doshi ............... G06N 3/08
2019/0147344 A1*  5/2019  Zhang .......... G06N 3/0454
                                                        706/25
2019/0188562 A1*  6/2019  Edwards ........... G06N 3/04

OTHER PUBLICATIONS

Erwan Le Merrer et al., "Adversarial Frontier Stitching for Remote Neural Network Watermarking", arXiv:1711.01894v1 [cs.CR] Nov. 6, 2017, 12 pages.

(Continued)

*Primary Examiner* — Edward Zee
(74) *Attorney, Agent, or Firm* — Squire Patton Boggs (US) LLP (57) ABSTRACT

Systems, methods, apparatuses, and computer program products for providing an anti-piracy framework for Deep Neural Networks (DNN). A method may include receiving authorized raw input at a protective transform module. The method may also include receiving unauthorized raw input at a restrictive deep neural network. The method may further include processing the authorized raw input at the protective transform module to generate a processed input. In addition, the method may include feeding the processed input into the restrictive deep neural network. The method may also include generating a result based on the processed input and the unauthorized raw input. Further, the result may include a different learning performance between the authorized raw input and the unauthorized raw input.

15 Claims, 5 Drawing Sheets

(56) References Cited

OTHER PUBLICATIONS

Bita Darvish Rouhani et al., "DeepSigns: A Generic Watermarking Framework for Protecting the Ownership of Deep Learning Models", arXiv:1804.00750v2 [cs.CR] May 31, 2018, 13 pages.

Yuki Nagai et al., "Digital Watermarking for Deep Neural Networks", International Journal of Multimedia Information Retrieval (2018) 7:3-16, https://doi.org/10.1007/s13735-018-0147-1, 14 pages.

Yusuke Uchida et al., "Embedding Watermarks into Deep Neural Networks", Oral Session 5: Best Paper Candidate, ICMR'17, Jun. 6-9, 2017, Bucharest, Romania, DOI: http://dx.doi.org/10.1145/3078971.3078974, 9 pages.

Jialong Zhang et al., "Protecting Intellectual Property of Deep Neural Networks with Watermarking", Session 5 Machine Learning 1, ASIACCS'18, Jun. 4-8, 2018, Incheon, Republic of Korea, https://doi.org/10.1145/3196494.3196550, 13 pages.

\* cited by examiner

ANTI-PIRACY FRAMEWORK FOR DEEP NEURAL NETWORKS

CROSS-REFERENCE TO RELATED APPLICATIONS

This application claims priority from U.S. provisional patent application No. 62/777,665 filed on Dec. 10, 2018. The contents of this earlier filed application are hereby incorporated by reference in their entirety.

FIELD

Some example embodiments may generally relate to neural networks. For example, certain example embodiments may relate to apparatuses, systems, and/or methods for providing an anti-piracy framework for Deep Neural Networks (DNN).

BACKGROUND

Deep Neural Networks (DNN) have demonstrated powerful abilities in solving many learning problems ranging from computer vision to biomedical analytics. Building such a model that performs well is generally a substantial task, usually requiring massive human-labeled training data, powerful computing hardware, and researchers' skills and efforts. The trained DNN may be profitable, and many commercial companies are deploying trained DNN models as a backend to provide service to customers. Meanwhile, these companies have been taking into consideration intellectual property (IP) protection and security issues of the trained DNN models.

Although some DNN models are open to the public with permission to use them for non-commercial purposes, many DNN model owners in commercial applications expect to keep the trained DNN models private, due to certain business considerations and/or privacy and security issues. Thus, trained DNNs are becoming a new form of valuable IP for model owners to ensure access control so that only authorized users can access the trained model and benefit from its high learning capabilities.

Although research has begun to address some of the security issues of DNN models, they are mainly from three directions. These include watermarking, adversarial examples, and poisoned training data. Inspired by the digital watermarking and fingerprinting techniques, recent studies introduced watermarks into DNN models to protect IP. A regularizer term in a loss function has been used during training to exert the watermark into the model weights or the response layers. It has also been proposed to identify the ownership of the DNN models by taking advantage of adversarial examples lying near the decision boundaries of the models. The randomly generated adversarial examples are considered as the individual signature of the given DNN model. If the adversarial examples match the testing model, ownership of the model is claimed. Previous work researched the impact of the poisoned training data on the performance of the trained DNN models. The training data was poisoned by embedding designed watermarks into a portion of the training data and mislabeling them. These poisoned training data potentially leave a backdoor in the models.

Although the above methods, to some extent, may facilitate IP identification during a post-piracy investigation, they do not actively address the problem of unauthorized access and piracy. For instance, it may be possible for an intruder to steal the entire DNN model, and profit from it, which cannot be easily prevented by conventional password-based access control to the computing system. Thus, there is a need to investigate the techniques to enable access control to prevent unauthorized users from illicit use or embezzlement of the trained DNN models.

SUMMARY

One embodiment to prevent piracy and provide access control may be directed to a method. The method may include receiving authorized raw input at a protective transform module. The method may also include receiving unauthorized raw input at a restrictive deep neural network. The method may further include processing the authorized raw input at the protective transform module to generate a processed input. The method may further include feeding the processed input into the restrictive deep neural network. In addition, the method may include generating a result based on the processed input and the unauthorized raw input. In an example embodiment, the result may include a different learning performance between the authorized raw input and the unauthorized raw input.

In accordance with another example embodiment to prevent piracy and provide access control, an apparatus may include at least one processor and at least one memory including computer program code. The at least one memory and the computer program code may be configured to, with the at least one processor, cause the apparatus at least to receive authorized raw input at a protective transform module. The apparatus may also be caused to receive unauthorized raw input at a restrictive deep neural network. The apparatus may also be caused to process the authorized raw input at the protective transform module to generate a processed input. The apparatus may further be caused to feed the processed input into the restrictive deep neural network. In addition, the apparatus may be caused to generate a result based on the processed input and the unauthorized raw input. In an example embodiment, the result may include a different learning performance between the authorized raw input and the unauthorized raw input.

In accordance with a further example embodiment to prevent piracy and provide access control, a computer program, embodied on a non-transitory computer readable medium, the computer program, when executed by a processor, may cause a processor to receive authorized raw input at a protective transform module. The processor may also be caused to receive unauthorized raw input at a restrictive deep neural network. The processor may also be caused to process the authorized raw input at the protective transform module to generate a processed input. The processor may further be caused to feed the processed input into the restrictive deep neural network. In addition, the processor may be caused to generate a result based on the processed input and the unauthorized raw input. In an example embodiment, the result may include a different learning performance between the authorized raw input and the unauthorized raw input.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for providing an anti-piracy framework for Deep Neural Networks (DNN).

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain example embodiments, and not in limitation thereof.

Certain example embodiments may provide mechanisms to protect a DNN model against unauthorized copy and use. In addition to piracy protection, a proper access control may also support privacy protection against the misuse of DNNs that produce decision results of a private or sensitive nature. For instance, in one example embodiment, weights of the DNN model may be encrypted with traditional data encryption methods such as Rivest-Shamir-Adleman (RSA) or advanced encryption standard (AES). However, this would mean that for the DNN model to be run properly, either the DNN model needs to be put into a trusted computing platform using trusted platform modules (TPMs) so that all the encrypted model parameters can be decrypted and then securely run to provide results, or the DNN computations directly on the encrypted parameters are enabled through homomorphic encryption or other types of encrypted-domain computation tools. Given the large number of parameters and the overall high computational power required, both of these security strategies may be costly. As such, certain example embodiments provide a framework that is able to protect the trained DNNs from piracy.

Figure 1:
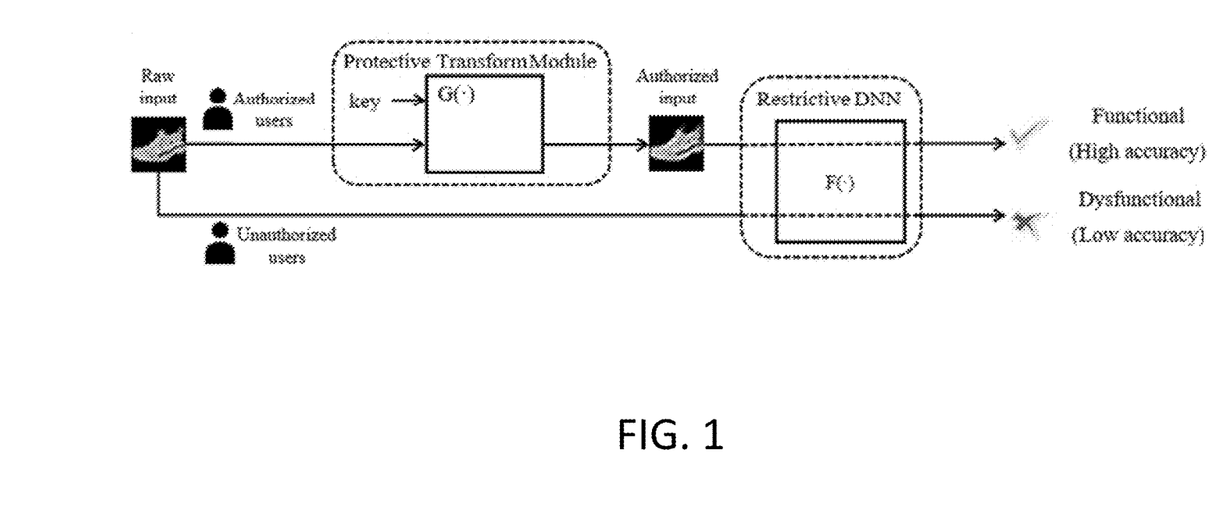
FIG. 1 illustrates a deep neural network (DNN) model framework, according to an example embodiment.

FIG. 1 illustrates a DNN model framework, according to an example embodiment. Certain example embodiments may maintain the main part of the DNN that can be run in a similar way as an ordinary DNN utilizing the available software-hardware platform, and produce state-of-the-art results when taking in an authorized type of input. As illustrated in FIG. 1, a transformation module may be provided that provides authorized inputs at a reasonable level of computational complexity by dividing the overall system into two parts. In certain example embodiments, the two-part design makes it possible to concentrate the security resource to protect the transformation module, for example, through a trusted computing platform, and utilize such module to achieve access control and privacy protection on the learning system with valuable and/or sensitive outcomes. The design may also provide protection against insiders (e.g., theft/piracy) of the trained machine-learning model.

In one example embodiment, the DNN model framework may be used to train a DNN model with special characteristics. For example, the DNN model may produce functional results with high recognition accuracy for authorized access, while it may produce dysfunctional results for unauthorized users. As illustrated in FIG. 1, the framework may include a protective transform module, which is capable of embedding specific signatures for authorized access, waiting for the restrictive DNN to verify. As also illustrated in FIG. 1, the input may be referred to as raw input, and the output of the protective transform module may be referred to as the processed input. According to an example embodiment, only authorized users may have the right key to the protective transform module so that the correct transformation can be made to the input images to guarantee the restrictive DNN functionality.

In an example embodiment, the framework may utilize intrinsic adversarial behavior of DNN as a means to transform the invalid inputs to valid inputs from authorized and unauthorized users, and differentiate the learning performance to authorized and unauthorized access, respectively. According to an example embodiment, the classification result of the framework may have a different accuracy rate depending on whether the access is from an unauthorized user or an authorized user. For instance, in one example embodiment, the accuracy rate may correspond to a model trained under the framework that will have a correct response to the authorized inputs, and incorrect response to the unauthorized inputs. Further, the accuracy rate may define how much the model prediction(s) matches the label (ground truth). In addition, the protective transform module may mimic a decryption module, allowing authorized users to generate the appropriate input for the DNN to function properly. According to an example embodiment, such a model may not require a password system to explicitly verify the users' identification, but instead, may implicitly distinguish whether the inputs are from authorized users or not. For instance, in one example embodiment, the authorized inputs may be obtained by properly transforming the raw inputs. In this sense, the ability to implicitly distinguish the inputs may mean that the model does not have an explicit module to identify the authorization, but the whole model has such ability from its difference performances to the authorized and unauthorized inputs.

As illustrated in FIG. 1, the framework of one example embodiment may include two components: a protective transform module, and a restrictive DNN. The restrictive DNN may be run in a similar manner as an ordinary DNN utilizing the available high-performance software-hardware platform. The restrictive DNN may also produce state-of-the-art results when taking in an authorized input. According to other example embodiments, the prevailing adversarial behavior of the DNN may be utilized to design a transformation module that provides such authorized inputs at a reasonable level of computational complexity without increasing too much computation complexity. Further, by dividing the overall system into these two parts, it may be possible to concentrate the security resource to protect the transformation module, for example, through a trusted computing platform.

According to certain example embodiments, an authorized user may transform the raw inputs with the assistance of the protective transform module to obtain proper processed inputs that may then be fed into the restrictive DNN, and obtain valid results. In one example embodiment, the raw inputs may include images directly obtained from one or more sources including, for example, cameras and websites. In another example embodiment, the transform module may transform these raw inputs properly for the restrictive DNN. Further, in one example embodiment, the authorized inputs may trigger the restrictive DNN to perform correctly (i.e., provide results with high accuracy that are valid). On the other hand, an unauthorized user may not be able to gain access to the protective transform module. When this occurs, the raw inputs may be fed directly into the restrictive DNN without proper transformations, and obtain inaccurate predictions or results. Thus, according to certain example embodiments, the restrictive DNN may function in conjunction with the protective transform model to recognize authorized and unauthorized inputs, and differentiate the learning performance. By differentiating the learning performance, the DNN may have different responses to authorized and unauthorized inputs. For example, authorized inputs may result in accurate results, whereas unauthorized inputs may lead to inaccurate results.

According to certain example embodiments, the framework may cover several aspects including, but not limited to, for instance: (1) modeling the threats from adversaries of different capabilities; (2) determining the network formulation and the proper protective transformation; (3) performance analysis and attack resilience; and (4) investigating a novel representative application of the framework.

In an example embodiment, various types of adversaries in the design of the protective transform module and the corresponding restrictive DNN may be considered to improve and optimize the system against threats. For example, a simple, opportunistic attack may be to directly copy and steal the restrictive DNN model. This type of attack may be feasible by even the least resourceful adversaries when no proactive protection is applied to the trained DNN model.

In other instances, a more advanced adversary may attack the protective transform module by generating perturbation patterns to emulate the effect of the transformation, aiming to deceive the restrictive DNN as if the inputs are from authorized users. Such attacks may be categorized into two scenarios: input-only attack and pair attack. In the input-only attack scenario, the adversary is limited to only accessing the raw inputs. For instance, the connection between the protective transform module and the restrictive DNN is secured with encryption or encapsulated within a secure tamper-proof hardware packaging making it difficult for the adversary to wiretap the processed inputs. In a pair attack, the adversary is assumed to have successfully obtained some input-output pairs of the protective transform module, and guess the transformation to emulate the real one with the help of these pairs.

Certain example embodiments may define a network formulation for the framework. For instance, $x_r$ represents the raw input, and $x_p$ represents the processed input. Further, $G(.)$ denotes the anti-piracy transform module. Thus, $x_p=G(x_r)$. $F(.)$ denotes the restrictive DNN with access control built-in. As previously noted, the restrictive DNN may provide a learning outcome at low accuracy with the raw input $F(x_r)$, while it may give a higher accuracy rate with the corresponding processed input $F(x_p)$. In certain example embodiments, low accuracy may result when the restrictive DNN gives incorrect results. In contrast, high accuracy may result when the restrictive DNN gives correct results.

According to an example embodiment, to ensure the restrictive DNN functionality to the processed input $x_p$ and to train the framework to fulfill the anti-piracy requirements, the loss for $x_p$ as the conventional cross-entropy loss may be defined according to equation (1) shown below.

$$E_p = -\Sigma_{i=1}^{N} p_i \log q_{p,i} \quad (1)$$

As shown in equation (1), N is the number of class, the vector $(p_1, p_2, \ldots, p_N)$ is the one-hot encoding ground truth, and the vector $(q_{p,1}, q_{9,2}, \ldots, q_{p,N})$ is the softmax output of $F(x_p)$.

In an example embodiment, to achieve the goal of the model being dysfunctional to the raw input $x_r$, the similarity loss for $x_r$ may be defined according to equation (2) shown below.

$$E_p = -\Sigma_{i=1}^{N} p_i q_{r,i} \quad (2)$$

As shown in equation (2), the vector $(q_{r,1}, q_{r,2}, \ldots q_{r,N})$ is the softmax output of $F(x_r)$. Since the vector $(p_1, p_2, \ldots p_N)$ is the one-hot encoding of the ground truth in terms of popular machine learning implementations, equation (2) indicates the probability that the result is correct for the raw input $x_r$. If $E_r$ is minimized, the result is in low accuracy. Alternatively, negative entropy loss may be used to characterize the goal of making the DNN model dysfunctional under unauthorized access, as shown in equation (3) below.

$$E_r = \Sigma_{i=1}^{N} q_{p,i} \log q_{pi} \quad (3)$$

By combining equations (1) and (2), the loss function E may be obtained as shown in equation (4).

$$E = \alpha E_p + \beta E_r + \gamma \|x_p - x_r\| \quad (4)$$

As shown in equation (3), $\alpha$ and $\beta$ are two hyperparameters to balance the two loss terms with respect to the raw input and the corresponding processed input, and $\gamma$ is the regularization coefficient.

According to an example embodiment, the regularizer in the third term may be utilized to confine the generated perturbations in a small range. This restriction may make it possible to preserve the processed input set so that it is similar to the raw input set as much as possible. However, in absence of such a regularization, the classification task for our framework can be substantially different from that for which the corresponding DNN structure was initially designed. Hence, in certain example embodiments, the regularizer can help retain the comparable learning performance between the framework and the corresponding DNN structure. In addition, according to certain example embodiments, the framework model may be easier to diverge during the training process, and may require careful adjustments on training parameters such as the learning rate. Thus, according to certain example embodiments, such regularizer may help to form practical applications described herein.

As illustrated in FIG. 1, the protective transform module may be designed through applying perturbations on the raw input. According to an example embodiment, additive perturbations may be applied by adding some perturbations to every pixel in an image (the configured version). According to another example embodiment, spatial perturbations may be applied, which warps the image spatially. In an example embodiment, the processed input may be the raw input incorporating the perturbation pattern. As described herein, certain example embodiments may provide several protective transform versions that range from simple to sophisticated.

One example embodiment may provide a fixed approach version of the protective transform. In the fixed approach, a universal perturbation matrix may be generated beforehand by the owners of the restrictive DNN. Further, a bipolar perturbation may be used in the fixed approach, whereby the amplitude of the perturbation in each pixel may be taken from $\{-\sigma, 0, \sigma\}$ with probability $\{p, 1-2p, p\}$, respectively. One possible drawback may be that a specific instance of perturbation might not be an optimal perturbation for the whole framework. As a result, a learned approach version of the protective transform may be provided.

In an example embodiment, the learned approach may find the optimal universal perturbation matrix for all input instances, and achieving the best differential in the learning performance between authorized and unauthorized users. According to certain example embodiments, both the fixed approach and the learned approach may be based on universal perturbation, which may be cracked under pair attack even when one input-output pair of the protective transform module is available to an adversary. This may be because the perturbation is identical to all raw inputs so that the subtraction between the pair is enough to recover the perturbation.

To address the drawback of the fixed and learned approaches, another example embodiment may provide a generator approach version of the protective transform module. The generator approach may be an input-dependent perturbation generator. Further, the generator approach may take various forms, such as for example, a fully-connected network, a convolutional network, or other parameterized forms, and generate a specific perturbation matrix for each input. In addition to additive perturbation-based transformation, other example embodiments may create the protective transform module as a geometric warping, which may have an important role in watermark protection of imagery assets. According to an example embodiment, this direction may increase the variety of the protective transform modules.

In an example embodiment, keys may be incorporated in the protective transform module. According to certain example embodiments, a key may include an n-bit number, where n may be 32, 64, 128, or 256. With the correct key, it may be possible for the protective transform module to give a proper transformation. Other example embodiments may share certain connections with data obfuscation. According to an example embodiment, to enhance the security strength of the protective transform so as to avoid security by obscurity, an advanced type of protective transform may be incorporated a more explicit use of a cryptographic-like key. For instance, the key may guide the generation of random perturbations and/or warping during the design of the protective transform and the corresponding restrictive DNN. This may enable the framework to be more flexible and secure. In addition, according to an example embodiment, the key may be revocable and replaceable without a complete rerun of the DNN training.

According to certain example embodiments, certain antipiracy performance data may be obtained from the framework. For instance, in certain example embodiments, performance of the framework may be on the Modified National Institute of Standards and Technology (MNIST) dataset, Fashion dataset, and Canadian Institute for Advanced Research-10 (CIFAR10) dataset. According to an example embodiment, in the fixed approach, the amplitude $\sigma=0.1$ and probability $p=0.2$. In the generator approach, the perturbation generator may be formed with the structure of a convolutional layer with a filter size of 5-by-5, cascaded by a bottleneck layer with a filter size of 1-by-1. In a further example embodiment, the number of channels in the intermediate layer may be 16 for the MNIST and the Fashion datasets, and 64 for the CIFAR10 dataset. According to another example embodiment, a tan h function may be used as the activation in the output layer.

As shown below, Table 1 and Table 2 present the structure of two DNN models used as host models. According to certain example embodiments, a simple convolutional neural network (CNN) and Resent-20 may be used as the architecture of the restrictive DNN. The detailed structure of the simple CNN is shown in Table 1, and the rectified linear unit (ReLU) may be used as the activation function in each layer. In an example embodiment, since all the components in the framework may be differentiable, a stochastic gradient descent (SGD) optimizer may be used to train the restrictive DNN under the framework. In particular, the hyper-parameters may be set as follows: $\alpha=1$, $\beta=1$, and $\gamma=0.01$. In an example embodiment, the initial learning rate may be set to 0.1 and divided by 10 every 10 k iterations. Further, the weight decay may be set to $5\times10^{-4}$, the momentum to 0.9, and the batch size to 128. Furthermore, in certain example embodiments, the models may be trained up to a total of 40 k iterations.

In certain example embodiments, the restrictive DNN may be trained on various datasets such as, for example, three datasets with multiple DNN architectures using three protective transform modules. To show that the framework does not degrade the performance of the DNN structures, the DNN may be trained without the restrictive (e.g., antipiracy) design for a baseline reference. According to an example embodiment, for the MNIST and the Fashion datasets, the grayscale images may be normalized to the range [0, 1]. In addition, for the CIFAR10 dataset, the color images may be normalized to the range of [−1, 1], and follow a simple data augmentation: a 28×28 crop may be randomly sampled from the original image or its horizontal flip. In an example embodiment, the single view of the 28×28 middle crop of the images in CIFAR10 may be evaluated.

TABLE 1

The structure of simple a CNN used.

| Layer | Output size | Building block |
|---|---|---|
| conv1 | 28 × 28 | [3 × 3, 32] |
| pool1 | 14 × 14 | max, 2 × 2 |
| conv2 | 14 × 14 | [3 × 3, 64] |
| pool2 | 7 × 7 | max, 2 × 2 |
| fc1 | 1024 | dropout: 0.5 |
| fc2/output | 10 | softmax |

In Table 2, performances of the framework on different datasets according to an example embodiment are shown. For the three protective transform modules, the values outside the parentheses represent the performance to the authorized access (i.e., feeding the transformed input into the DNN), and the values inside the parentheses are the prediction accuracy to the unauthorized access (i.e., feeding the raw input). As shown in Tables 1 and 2, a similarity loss may be used for the raw inputs (i.e., unauthorized access in the training stage).

TABLE 2

The performance of the framework where the numbers in the parentheses are the performance by unauthorized access

| Model | Dataset | | | |
|---|---|---|---|---|
| | MNIST | Fashion | Fashion | CIFAR10 |
| | simple CNN | | Resnet-20 | |
| Baseline | 99.12% | 91.80% | 92.63% | 90.74% |
| Fixed | 99.24% | 91.88% | 91.65% | 89.73% |
| | (0.24%) | (1.09%) | (0.63%) | (0.52%) |
| Learned | 99.18% | 92.06% | 92.56% | 90.58% |
| | (0.10%) | (2.18%) | (0.65%) | (0.86%) |
| Generator | 99.23% | 91.82% | 92.55% | 90.61% |
| | (0.23%) | (2.76%) | (1.55%) | (0.78%) |

Furthermore, from Table 2, the three perturbation-based anti-piracy transformations satisfy all the anti-piracy requirements. The restrictive DNN models under authorized access have comparable performances to the corresponding baseline DNN models. In addition, Table 2 shows that some performances of the restrictive DNN models exceed the baselines. On the other side, the values in the parentheses indicate that the restrictive DNN models are dysfunctional with the raw inputs.

For the Fixed method, under authorized access, a testing accuracy of 99.24%, 91.88%, 91.65%, and 90.84%, respectively were obtained in restrictive DNN models. As shown in Table 2, there are small drops of 1% in accuracy in the third and fourth models compared with the corresponding baselines. A possible reason of this small drop may be that these two models might not have obtained a good candidate of the universal perturbation pattern since the Fixed method randomly generates the pattern beforehand. In practical situations, as the complexity of datasets and models increases, it may become increasingly difficult to generate a satisfactory universal perturbation. To overcome this problem, the other two approaches can learn the perturbation pattern during the DNN training process. Due to the learning strategy, the models can obtain the optimal perturbation patterns and the restrictive DNNs. These results reflect that the gaps are small between the performances of the restrictive DNN models and the corresponding baseline in the Learned and Generator approaches, suggesting that the anti-piracy consideration in the framework imposes negligible penalty in the learning performance for authorized users.

Figure 2A:
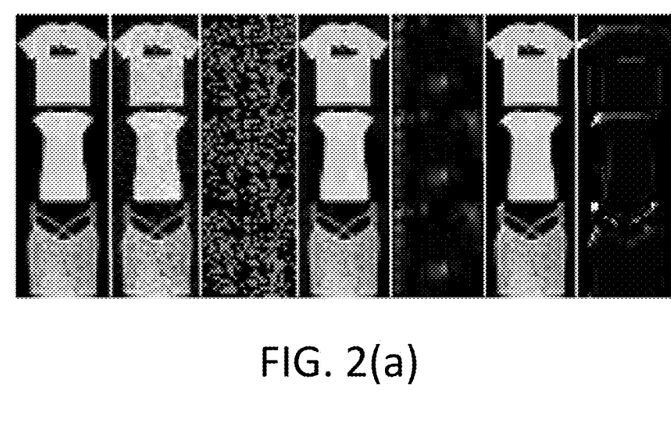
FIG. 2(a) illustrates an example convolutional neural network (CNN) model on a Fashion dataset, according to an example embodiment.
Figure 2B:
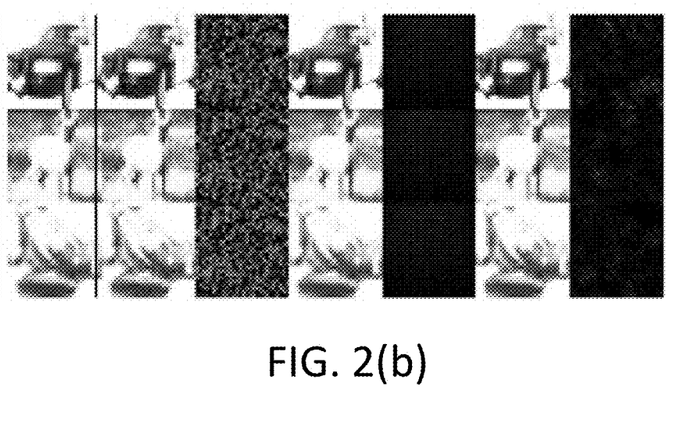
FIG. 2(b) illustrates a Resent-20 model on a Canadian Institute for Advanced Research-10 (CIFAR10) dataset, according to an example embodiment.

In an example embodiment, the restrictive DNN model may be obtained. This model may differentiate the learning performance to the raw inputs and the processed inputs. FIG. 2(a) illustrates a simple CNN model on the Fashion dataset, according to an example embodiment. Further, FIG. 2(b) illustrates a Resent-20 model on the CIFAR10 dataset, according to an example embodiment. That is, FIGS. 2(a) and 2(b) illustrate a protective transform module with the incorporation of regularization, according to an example embodiment. As illustrated in FIGS. 2(a) and 2(b), column 1 is the raw inputs, and columns 2 and 3 are the processed inputs and the perturbation in the Fixed method. Further, columns 4 and 5 are the processed inputs and the perturbation in the Learned method. In addition, columns 6 and 7 are the processed inputs and the Generator method.

As noted above, FIGS. 2(a) and 2(b) illustrate examples of the protective transform with the incorporation of regularization. To facilitate the examination of the difference between raw inputs and processed inputs, the amplitude of the difference may be magnified by 5 times. Particularly for the Learned and Generator approaches, the difference between the raw input and the corresponding processed input may appear to be negligible from a human visual system. This observation may indicate the ability of the restrictive DNN models to differentiate the raw inputs and the processed inputs even though the perturbation is nearly imperceptible, similar to the effect of many adversarial examples. Moreover, it may be possible to take this advantage to use, store, and circulate the processed images in the physical world as the raw images or common images. For instance, in one example embodiment, it may be possible to make an analogy between the processed images and the digital media with digital watermarks.

According to certain example embodiments, it may be possible to use the framework to take advantage of the sensitivity of the DNN models to protect the DNN models from piracy, and demonstrate its effectiveness to prevent the unauthorized access. FIGS. 2(a) and 2(b) also reveal differences among the three perturbation-based protective transform modules. The last two methods may be capable of generating much subtler perturbation patterns due to the learning strategy applied in the module. In addition, the Generator method may provide the optimal individual perturbation pattern for inputs with the help of the training samples that increases the complexity of the protective transform module.

In certain example embodiments, for each data set and design choice, the effectiveness to protect the trained DNNs from unauthorized access may be evaluated. Further, the security of the framework may be stress tested against the best-effort attacks from unauthorized users. These attacks may include direct piracy, input-only attack, and pair attack. Direct piracy refers to directly copying the restrictive DNN model, and may represent the weakest possible attack. On the other hand, input-only attack refers to attacks only with the raw inputs. This assumes that the adversary can access the raw inputs only and guess the protective transform. Further, pair attack refers to attacks with the raw and corresponding processed input pairs. In pair attacks, it is assumed that the adversary generates a fake protective transform to emulate the genuine one, provided with the pairs of the raw and corresponding processed input. Additionally, certain example embodiments may conduct experiments multiple times, and record both the average and the best attack performance.

According to certain example embodiments, under direct piracy, the accuracy of the models may be around 1%, indicating that direct piracy of the DNN model merely leads to invalid classification results. This suggests that the framework of certain example embodiments may be immune to this adversary.

As for the input-only attack scenario, an adversary may be expected to generate a universal perturbation to mimic the function of the protective transform modules. Here, it may be assumed that the adversary knows the settings of the universal perturbation generation, and applies the same strategy (i.e., a bipolar perturbation with the same parameters σ and p. the results in the column of input-only attack in Table 3 show that these Input-only attacks increase the classification accuracy of the restrictive DNNs with the Fixed and Learned modules. This may be because the input-only attack strategy mimics the first two methods to apply universal perturbations to all raw inputs, and eventually attenuates the differentiation ability between the processed inputs and the fake processed inputs.

According to the best attack performances, these two models have comparable vulnerability to input-only attack strategy. Nevertheless, there are still more than 10% performance gaps between the models after Input-only attack and the models in the framework. On the other side, even after the attack, the DNN with the Generator module may still provide a lower classification accuracy by a considerable amount for unauthorized users than an authorized user can obtain, indicating that the Generator approach can defend such an attack.

TABLE 3

The performance of the restrictive DNN models under various attacks.

| Model (Accuracy) | Direct piracy | Input-only attack | | Pair attack | | | | | |
| | | | 10% | | 50% | | 100% | |
| | | Mean | Best | Mean | Best | Mean | Best | Mean | Best |
| --- | --- | --- | --- | --- | --- | --- | --- | --- | --- |
| Fixed (91.65%) | 0.63% | 66.23% | 78.96% | — | — | — | — | — | — |
| Learned (92.56%) | 0.65% | 55.37% | 79.42% | — | — | — | — | — | — |
| Generator (92.55%) | 1.55% | 3.17% | 4.95% | 75.05% | 82.11% | 76.31% | 84.17% | 77.24% | 86.00% |

As for Pair attack, the models with the Fixed and Learned approaches are expected to be vulnerable and circumvented with only one input-output pair of the protective transform module since the perturbation in each input may be identical in these two methods. However, in an example embodiment, the Generator method may avoid such one-pair-crack predicament. In doing so, it may be assumed that the adversary knows the structure of the protective transform module in the Generator method, but does not know the parameters. The task for the adversary is to recover the protective transform module with the help of a number of input-output pairs. The adversary can learn the parameters in the transform module with the given pairs as the input and the ground truth.

Certain example embodiments may examine the model with the Generator method under the Pair attack using 10%, 50%, and 100% of the pairs from the training set, respectively. As shown in Table 3, the pair attack manages to cheat the restrictive DNN to some extent, increasing the accuracy from 1.55% to around 85% in the best case from an adversary point of view, compared to direct piracy. This means that the pair attack strategy is capable of confusing the restrictive DNN model to some extent with the processed inputs and the fake processed inputs. However, this type of attack still fails to achieve the comparable accuracy with the model in the anti-piracy framework, which is 92.55% in the example embodiments described herein. Furthermore, the number of pairs used in the pair attack may influence the attack performance positively. Specifically, when the number of pairs increases from 10% to 100% of the training set, the value enhances slightly from 75.05% to 77.24% in average performance, and from 82.11% to 86.00% in the best case scenarios for the adversaries.

According to certain example embodiments, to provide a context to the classification accuracy in deep model R&D, a 1% boost in the final performance may often be considered as a significant improvement. Thus, the more than 5% performance gaps between the model in the restrictive framework and those after various adversarial attacks, presented in Table 3, demonstrate the resistance of the framework of certain example embodiments to the various attacks.

Figure 3:
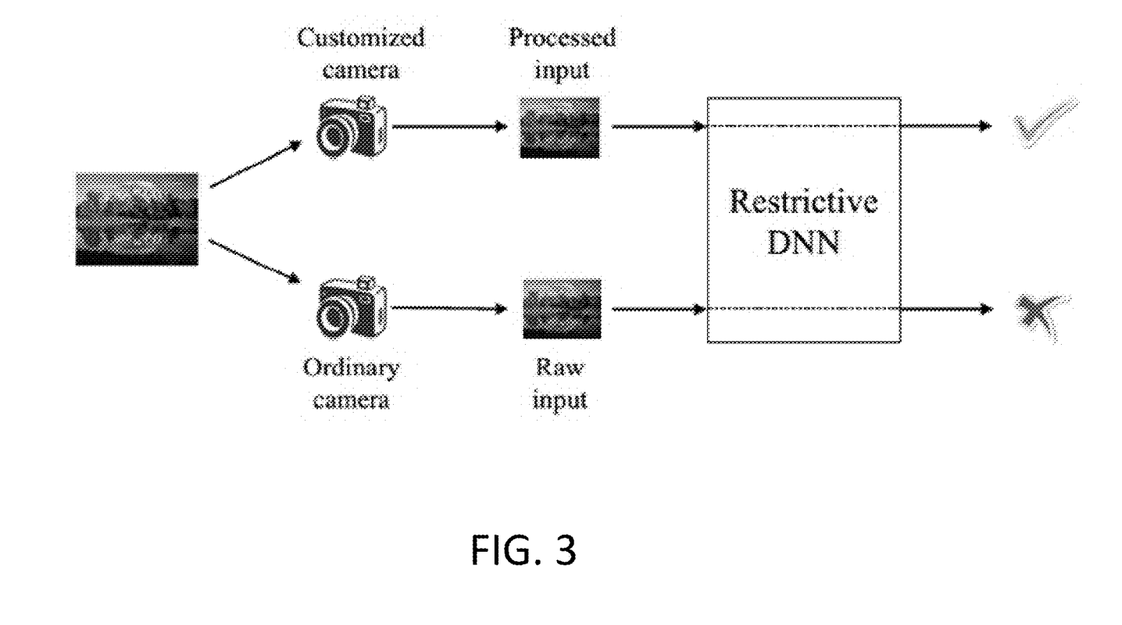
FIG. 3 illustrates a privacy-aware smart camera application, according to an example embodiment.

FIG. 3 illustrates a privacy-aware smart camera application, according to an example embodiment. In this application, the protective transform module may be incorporated into various devices including, but not limited to, for example, cameras so that such customized cameras may become authorized cameras. As illustrated in FIG. 3, only pictures taken by such authorized cameras are valid inputs for the corresponding restrictive DNN. Further, it may provide accurate learning results while the photos from other cameras make the DNN work in a dysfunction mode so that no reliable learning results would be produced. In an example embodiment, when a DNN is being used for such privacy sensitive application as biometric identification or health analytics, the learning system may not compromise privacy through inquiries of arbitrary inputs.

In this scenario, the authorized users may obtain access to the protective transform module by taking pictures with authorized cameras. The advantage of this scenario may stem from the difficulty of obtaining raw input and processed input simultaneously, as the processing can be encapsulated within the camera's embedded system, and no intermediate signals may be exported. As such, a user may only obtain either a protected transformed image from an authorized camera (which may lead to a learning outcome with a high accuracy), or a regular image from an ordinary camera (which may lead to a learning outcome with a low accuracy). Thus, certain example embodiments may enhance the difficulty in acquiring the pairs for the Pair attack strategy, and on the other side, benefits the resistance to the privacy breach and attacks.

According to certain example embodiments, due to the regularization in designing the restrictive DNN during the training, a regular camera output and the corresponding protective transformed photo may have little distinguishable differences by a human vision system. Thus, the pictures taken from the customized cameras may retain their physical meanings and appearance, and may be considered, stored, circulated, and used as the common images.

In other example embodiments, multiple cameras may be used. In this case, the key may be incorporated in to the framework. For example, if the key mechanism is embedded in the DNN model successfully, the model may not have to be re-trained or individually stored and deployed one per camera, but instead, becomes reusable under a set of keys. This may allow for a single restrictive DNN model to be functional to serve a number of cameras (or equivalently, a number of users). In an example embodiment, the key may be a cryptographic key, such as, for example, a large random number satisfying certain properties. Only a party with knowledge to the correct key may perform the respective function/calculation properly and/or obtain the protected information.

According to certain example embodiments, conventional training of the DNN model may include the DNN model to learn the features of the raw input. When the pre-trained DNN model is fixed, and well-designed small perturbations are added to the raw inputs, these adversarial examples may be able to fool the model by rendering the classification outcome deviated significantly from the result before applying the perturbations. Thus, the baseline models may be valid to the raw inputs, but may become ineffective to their adversarial examples. Accordingly, in certain example embodiments, the roles of the raw input and adversarial examples in the baseline DNN models may be interchanged. In particular, the restrictive DNN model may learn the appropriate features of the perturbed raw inputs (i.e., the processed inputs), and the raw inputs may effectively become the adversarial examples to the restrictive DNN model. Thus, the problem needed to be solved is given the adversarial examples, to find the equivalent raw inputs and their corresponding DNN model. However, certain example embodiments provide a feasible transformation module to produce such an equivalent raw input (i.e., the anti-piracy DNN) that can classify the equivalent raw input in high precision and the adversarial examples in low accuracy.

Figure 4:
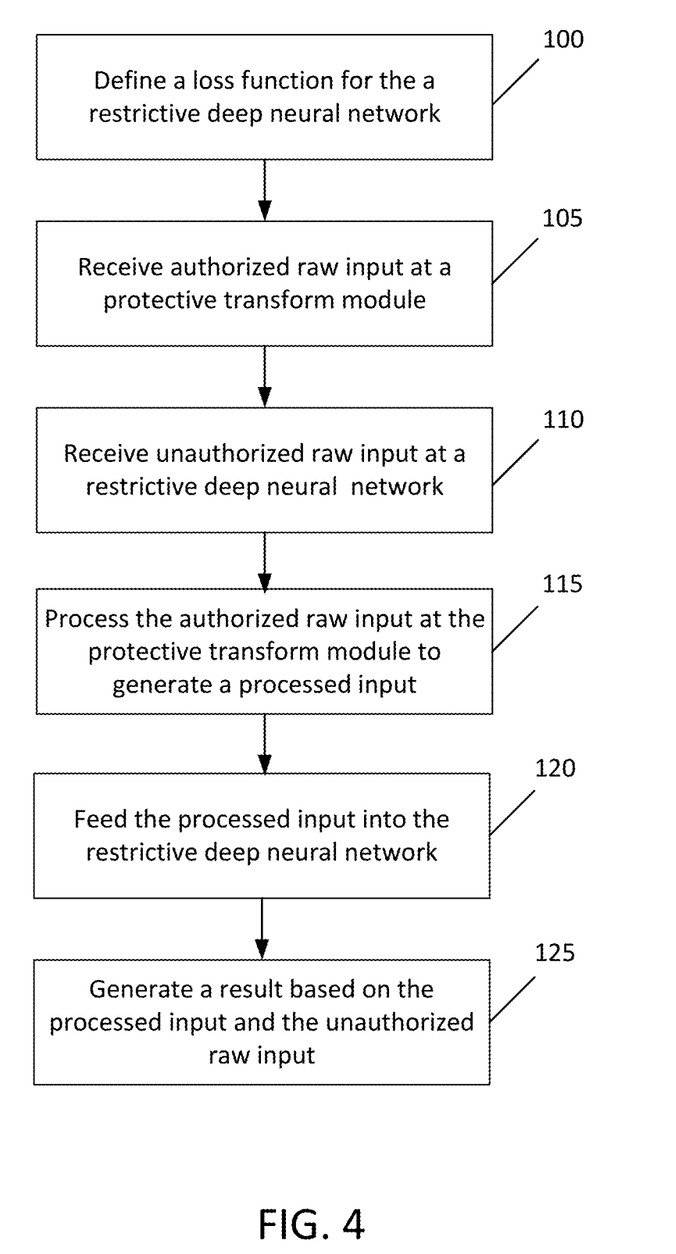
FIG. 4 illustrates a flow diagram of a method, according to an example embodiment.

FIG. 4 illustrates an example flow diagram of a method, according to an example embodiment. In certain example embodiments, the flow diagram of FIG. 4 may be performed by a computer, such as a workstation PC, for instance similar to apparatus 10 illustrated in FIG. 5. According to one example embodiment, the method of FIG. 4 may include initially, at 100, defining a loss function for the restrictive deep neural network. The method may also include, at 105, receiving raw input at a protective transform module of a deep neural network framework. The method may further include, at 110, receive unauthorized raw input at a restrictive deep neural network. The method may also include, at 115, processing the authorized raw input at the protective transform module to generate a processed input. Further, the method may include, at 120, feeding the processed input into the restrictive deep neural network. In addition, the method may include, at 125, generating a result based on the processed input and the unauthorized raw input. In an example embodiment, processing the authorized raw input may include applying a perturbation on the authorized raw input. In another example embodiment, the result may include a different learning performance between the authorized raw input and the unauthorized raw input.

In an example embodiment, the perturbation may include a predetermined universal perturbation matrix for all inputs, a universal perturbation matrix for all inputs, or a specific perturbation matrix for each input. In another example embodiment, the perturbation may include an additive perturbation or a spatial perturbation. According to a further example embodiment, the authorized raw input may include an image obtained from one or more sources. According to another example embodiment, the protective transform module may include a key to guide generation of random perturbations or warping for the authorized raw input.

Figure 5:
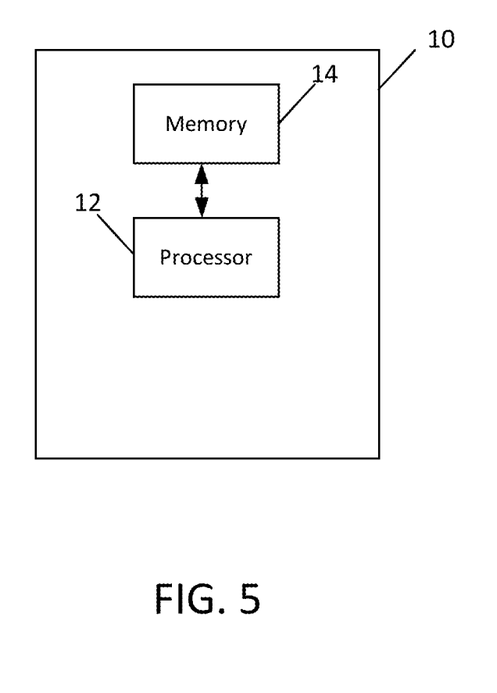
FIG. 5 illustrates an apparatus, according to an example embodiment.

FIG. 5 illustrates an apparatus 10 according to an example embodiment. In an embodiment, apparatus 10 may be a desktop PC, workstation PC, trustworthy computing module (TPM), or other similar type devices/hardware, or a combination of one or more of these devices/hardware elements.

In some example embodiments, apparatus 10 may include one or more processors, one or more computer-readable storage medium (for example, memory, storage, or the like), one or more radio access components (for example, a modem, a transceiver, or the like), and/or a user interface. It should be noted that one of ordinary skill in the art would understand that apparatus 10 may include components or features not shown in FIG. 5.

As illustrated in the example of FIG. 5, apparatus 10 may include or be coupled to a processor 12 for processing information and executing instructions or operations. Processor 12 may be any type of general or specific purpose processor. In fact, processor 12 may include one or more of secure cryptoprocessor, general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 5, multiple processors may be utilized according to other embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes illustrated in FIGS. 1-4.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods illustrated in FIGS. 1-4.

Additionally or alternatively, in some embodiments, apparatus 10 may include an input and/or output device (I/O device). In certain embodiments, apparatus 10 may further include a user interface, such as a graphical user interface or touchscreen.

In an embodiment, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to certain example embodiments, processor 12 and memory 14 may be included in or may form a part of processing circuitry or control circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

Certain example embodiments described herein provide several technical improvements, enhancements, and/or advantages. In some example embodiments, it may be possible to provide a framework that focuses on access control of trained DNN models. According to certain example embodiments may deny the unauthorized access of the DNN models. In addition, even if one DNN model is stolen, the unauthorized users cannot use it properly. According to other example embodiments, this framework may reduce the abuse and illicit use of the DNN model that functions with sensitive data, such as, for example, biomedical analytics. In addition, it may be possible to provide access control, protect privacy, and mitigate piracy/theft to the trained DNN models.

In certain example embodiments it may be possible to provide a framework to obtain a trained DNN that triggers privacy prevention via intrinsic adversarial behavior. For instance, the framework may recognize the inputs from authorized users and unauthorized users, and differentiate the learning performance of the inputs from these two types of users. Further, other example embodiments may provide a means to investigate the security issues to potential adversaries, and provide threat modeling and testing of the framework under multiple levels of attacks.

A computer program product may comprise one or more computer-executable components which, when the program is run, are configured to carry out some example embodiments. The one or more computer-executable components may be at least one software code or portions of it. Modifications and configurations required for implementing functionality of an example embodiment may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to an example embodiment, an apparatus, such as a device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with steps in a different order, and/or with hardware elements in configurations which are different than those which are disclosed. Therefore, although the invention has been described based upon these example embodiments, it would be apparent to those of skill in the art that certain modifications, variations, and alternative constructions would be apparent, while remaining within the spirit and scope of example embodiments.

PARTIAL GLOSSARY

AES Advanced Encryption Standard
CNN Convolutional Neural Network
DNN Deep Neural Network
MNIST Modified National Institute of Standards and Technology
ReLU Rectified Linear Unit
RSA Rivest-Shamir-Adleman
SGD Stochastic Gradient Descent
TPM Trusted Platform Modules

We claim:
1. A method, comprising:
receiving authorized raw input at a protective transform module;
receiving unauthorized raw input at a restrictive deep neural network;
processing the authorized raw input at the protective transform module to generate a processed input;

feeding the processed input into the restrictive deep neural network; and generating a result based on the processed input and the unauthorized raw input, wherein the result comprises a different learning performance between the authorized raw input and the unauthorized raw input, wherein processing the authorized raw input comprises applying a perturbation on the authorized raw input, and wherein the perturbation comprises a predetermined universal perturbation matrix for all inputs, a universal perturbation matrix for all inputs, or a specific perturbation matrix for each input.

2. The method according to claim 1, wherein the method further comprises defining a loss function for the restrictive deep neural network.

3. The method according to claim 1, wherein the perturbation comprises an additive perturbation or a spatial perturbation.

4. The method according to claim 1, wherein the authorized raw input comprises an image obtained from one or more sources.

5. The method according to claim 1, wherein the protective transform module comprises a key to guide generation of random perturbations or warping for the authorized raw input.

6. An apparatus, comprising:
at least one processor; and
at least one memory comprising computer program code, the at least one memory and the computer program code are configured, with the at least one processor to cause the apparatus at least to
receive authorized raw input at a protective transform module;
receive unauthorized raw input at a restrictive deep neural network;
process the authorized raw input at the protective transform module to generate a processed input;
feed the processed input into the restrictive deep neural network; and
generate a result based on the processed input and the unauthorized raw input,
wherein the result comprises a different learning performance between the authorized raw input and the unauthorized raw input,
wherein processing the authorized raw input comprises applying a perturbation on the authorized raw input, and
wherein the perturbation comprises a predetermined universal perturbation matrix for all inputs, a universal perturbation matrix for all inputs, or a specific perturbation matrix for each input.

7. The apparatus according to claim 6, wherein the at least one memory and the computer program code are further configured, with the at least one processor to cause the apparatus at least to define a loss function for the restrictive deep neural network.

8. The apparatus according to claim 6, wherein the perturbation comprises an additive perturbation or a spatial perturbation.

9. The apparatus according to claim 6, wherein the authorized raw input comprises an image obtained from one or more sources.

10. The apparatus according to claim 6, wherein the protective transform module comprises a key to guide generation of random perturbations or warping for the authorized raw input.

11. A computer program, embodied on a non-transitory computer readable medium, the computer program, when executed by a processor, causes the processor to:
receive authorized raw input at a protective transform module;
receive unauthorized raw input at a restrictive deep neural network;
process the authorized raw input at the protective transform module to generate a processed input;
feed the processed input into the restrictive deep neural network; and
generate a result based on the processed input and the unauthorized raw input,
wherein the result comprises a different learning performance between the authorized raw input and the unauthorized raw input,
wherein processing the authorized raw input comprises applying a perturbation on the authorized raw input, and
wherein the perturbation comprises a predetermined universal perturbation matrix for all inputs, a universal perturbation matrix for all inputs, or a specific perturbation matrix for each input.

12. The computer program according to claim 11, wherein processor is further caused to define a loss function for the restrictive deep neural network.

13. The computer program according to claim 11, wherein the perturbation comprises an additive perturbation or a spatial perturbation.

14. The computer program according to claim 11, wherein the authorized raw input comprises an image obtained from one or more sources.

15. The computer program according to claim 11, wherein the protective transform module comprises a key to guide generation of random perturbations or warping for the authorized raw input.

* * * * *